(12) United States Patent
Fausak

(10) Patent No.: US 7,467,217 B2
(45) Date of Patent: Dec. 16, 2008

(54) REFLECTIVE DRIVER

(75) Inventor: Andrew T. Fausak, San Jose, CA (US)

(73) Assignee: Wyse Technology Inc., San Jose, CA (US)

( * ) Notice: Subject to any disclaimer, the term of this patent is extended or adjusted under 35 U.S.C. 154(b) by 681 days.

(21) Appl. No.: 11/200,084

(22) Filed: Aug. 10, 2005

(65) Prior Publication Data

US 2007/0038768 A1   Feb. 15, 2007

(51) Int. Cl.
*G06F 15/16* (2006.01)
(52) U.S. Cl. .................. 709/230; 709/203; 709/205; 709/229; 709/228
(58) Field of Classification Search ............ 709/203, 709/205, 229, 228, 230
See application file for complete search history.

(56) References Cited

U.S. PATENT DOCUMENTS

| 5,809,028 | A | * | 9/1998 | Nethercott et al. | 370/467 |
| 5,878,225 | A | * | 3/1999 | Bilansky et al. | 709/227 |
| 6,195,677 | B1 | * | 2/2001 | Utsumi | 709/201 |

* cited by examiner

*Primary Examiner*—Michael Won
(74) *Attorney, Agent, or Firm*—McDermott Will & Emery LLP

(57) ABSTRACT

A system for communicating with a device is disclosed. The system includes a client configured to issue a request. The request represents an operation that the client wishes to have the device perform. The system further includes a server configured to receive the request from the client and translate the request into a format that is decipherable by the device, establish a logical connection with the device via the client, and forward the translated request to the device via the logical connection. The device acts on the translated request to effect the operation.

20 Claims, 1 Drawing Sheet

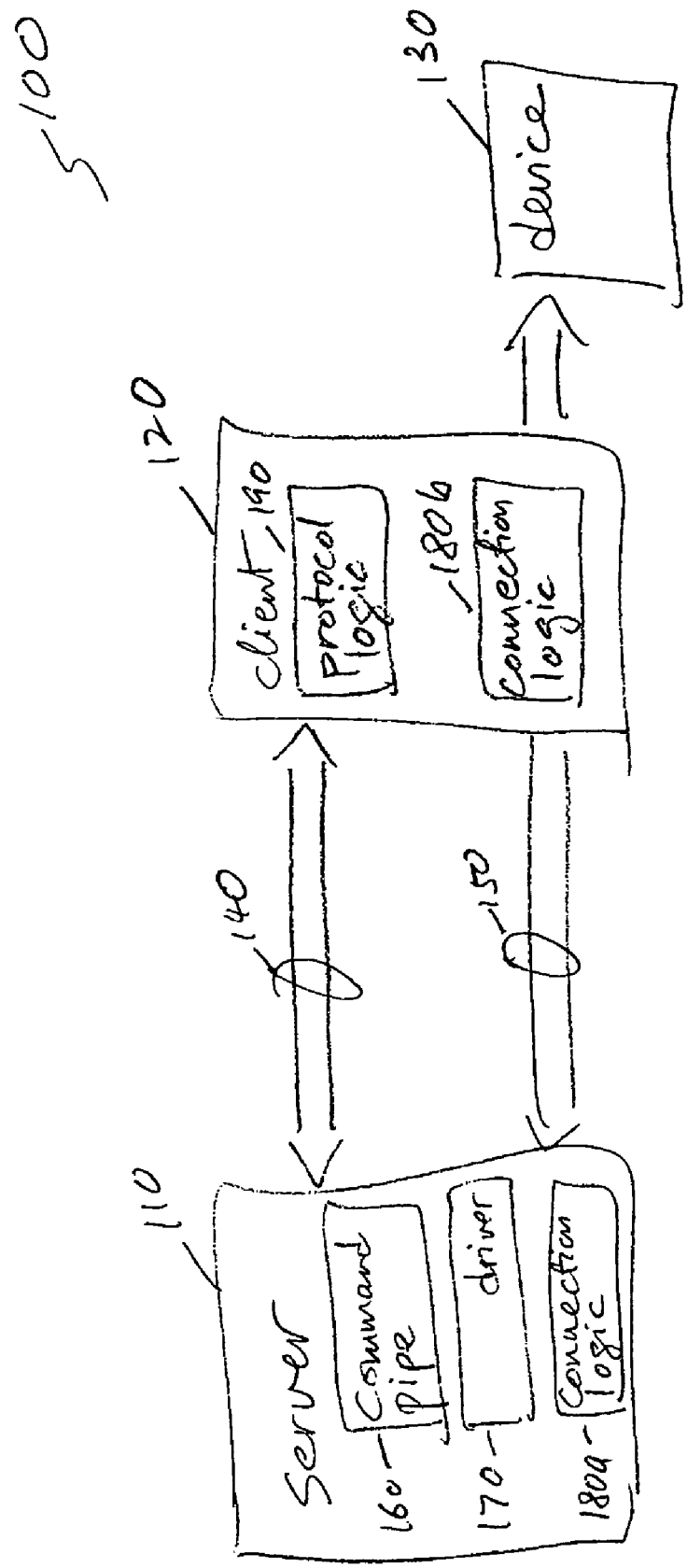

US 7,467,217 B2

REFLECTIVE DRIVER

CROSS-REFERENCES TO RELATED APPLICATION(S)

Not Applicable.

STATEMENT AS TO RIGHTS TO INVENTIONS MADE UNDER FEDERALLY SPONSORED RESEARCH OR DEVELOPMENT

Not Applicable.

BACKGROUND OF THE INVENTION

The present invention generally relates to file systems, and more specifically, to methods and systems for providing a reflective driver so as to allow read and/or write operations to be performed on a file system without any file system driver.

Under conventional systems, every device, whether it be a printer, disk drive, or keyboard, must have a driver program or driver; some functions may also require drivers. For example, drivers are required for all code or programs attempting to read and/or write a disk drive or media type. Many drivers, such as the keyboard driver, come with the operating system. For other devices, a new driver may need to be loaded if the device is to be connected to the operating system. A driver acts like a translator between the device and programs that use the device. Each device has its own set of specialized commands that only its driver knows. In contrast, most programs access devices by using generic commands. The driver, therefore, accepts generic commands from a program and then translates them into specialized commands for the device. The driver is distributed to and resides on the host (e.g., a computer) that is connected to the device.

The use of drivers may provide certain advantages. However, requiring the use of a driver in connection with a device may also be disadvantageous. For example, with respect to the NT File System (NTFS—a file system for the Window NT operating system), it is not currently possible to provide an embedded NTFS driver. In other instances, embedded drivers are also not possible. Furthermore, drivers have to be stored locally on the host and may need to be updated periodically. Consequently, maintaining the most current version of a driver across multiple hosts may become an issue.

Hence, it would be desirable to provide methods and systems that can be used to allow devices or functions to be accessed in a more efficient manner.

SUMMARY OF THE INVENTION

A system for communicating with a device is disclosed. In one embodiment, the system includes a client configured to issue a request, the request representing an operation that the client wishes to have the device perform, and a server configured to receive the request from the client and translate the request into a format that is decipherable by the device, establish a logical connection with the device via the client, and forward the translated request to the device via the logical connection. The device acts on the translated request to effect the operation.

In another embodiment, a reflective device driver system is disclosed. The reflective device driver system includes a device, a client having protocol logic, the protocol logic configured to issue a request, the request representing an operation that the client wishes to have the device perform, and a server having: a command pipe configured to receive the request from the client, a device driver having operating rules specific to the device, the device driver configured to generate a translated request that is decipherable by the device, and associated connection logic configured to establish a logical connection with the device via the client. The translated request is forwarded to the device via the logical connection. The device then acts on the translated request to effect the operation.

In one aspect, a method for facilitating communications between a client and a device is disclosed. Under the method, the client is directed to issue a request. The request represents an operation that the client wishes to have the device perform. The request is then forwarded to a server. The server is directed to translate the request into a format that is decipherable by the device. A logical connection is then established between the server and the device via the client. The translated request is forwarded to the device via the logical connection. The device acts on the translated request to effect the operation.

The present invention may provide a number of advantages and/or benefits. For example, the present invention allows certain file systems to be read and/or written without using a file system driver. As a result, utilities can be provided with the capability to read and/or write a file system before the file system is defined. Furthermore, access to the data region of a drive is possible without knowledge of the requirements of the file system.

Reference to the remaining portions of the specification, including the drawings and claims, will realize other features and advantages of the present invention. Further features and advantages of the present invention, as well as the structure and operation of various embodiments of the present invention, are described in detail below with respect to accompanying drawings, like reference numbers indicate identical or functionally similar elements.

BRIEF DESCRIPTION OF THE DRAWINGS

Aspects, advantages and novel features of the present invention will become apparent from the following description of the invention presented in conjunction with the accompanying drawings:

FIG. 1 is a simplified schematic diagram illustrating an embodiment of the present invention.

DESCRIPTION OF THE SPECIFIC EMBODIMENTS

The present invention in the form of one or more exemplary embodiments will now be described. FIG. 1 illustrates one embodiment of the present invention. The system 100 includes a server 110, a client 120 and a device 130.

The server 110 may include a driver 170 and related information associated with the device 130. The driver 170 and related information are used to facilitate communications and operations with respect to the device 130. For example, the driver 170 may be a file-system-driver usable to interact with a NTFS. It should be noted that drivers can be cascaded in such a manner that a complex set of drivers (corresponding to a number of functions) may be composed to collectively represent a complex driver (corresponding to a single function). To the client 120, the composition of functions is itself only a single function. The server 110 may further include a command pipe 160 to be used for receiving requests from the client 120. The requests may include requests pertaining to operations with respect to the device 130. For example, where the device 130 is the NTFS, the requests may pertain to read and/or write operations to be performed by the NTFS. Communications between the server 110 and the client 120 may be conducted via a communication path 140 using a designated protocol. The designated protocol is understandable to both the server 110 and the client 120. The command pipe 160 is configured to handle the designated protocol. Based on the disclosure and teachings provided herein, a person of ordinary skill in the art will appreciate how to identify the appropriate protocol to be used as the designated protocol in accordance with the present invention. The server 110 may also include connection logic 180a. As will be described further below, the connection logic 180a is used to establish a logical connection 150 between the server 110 and the device 130 via the client 120. The server 110 essentially functions as if the client 120 was part of itself, when in fact the server 110 is actually remotely connected to the client 120.

The client 120 may include protocol logic 190 that is configured to handle the designated protocol to be used for communications between the client 120 and the server 110. The designated protocol is further used to indicate the desired function that the client 120 is to perform with respect to the device 130. Furthermore, the client 120 may also include connection logic 180b. As will be further described below, the connection logic 180b is used to allow the logical connection 150 to be established between the server 110 and the device 130 via the client 120. In one embodiment, the client 120 is network bootable and is logically connected to the server 110. As will be further described below, the client 120 is able to perform tasks with respect to the device 130 through the server's knowledge of the device rules. The knowledge of the device rule may be derived from the driver 170. In an alternative embodiment, the client 120 is not booted through a network; instead, the client 120 is booted through local media, such as, the BIOS, DISK, etc. The client 120 may include any devices that desire to interact with the device 130 including, for example, a computer, a mobile device, etc. It should be noted that the client 120 by itself does not know how to interact or control the device 130.

The device 130 may include any number of devices, such as, peripheral devices including a file system, a printer, a scanning device, etc.

The following example illustrates how the system 100 operates. In this example, the device 130 is a file system. The file system includes a number of data partitions. In this instance, the client 120 desires to direct the file system to perform a read or write operation. Since the client 120 by itself does not know how to direct the file system to effect such operation, the client 120 forwards a request to the server 110 via the communication path 140. The request is created by the protocol logic 190 using the designated protocol. The request indicates the desired operation that the client 120 wishes to perform with respect to the file system. The request is received by the command pipe 160.

The command pipe 160 then forwards the request, or information contained therein, to the connection logic 180a. In response, the connection logic 180a established a logical connection 150 between the server 110 and the file system via the client 120. The connection logic 180b residing on the client 120 helps facilitate the creation of such logical connection 150. It should be noted that the logical connection 150 may traverse one or more computer networks (not shown).

Once the logical connection 150 is established, the server 110 provides the request, or information contained therein, to the driver 170. The driver 170 is configured to generate information or instructions that are understandable to the file system. For example, the instructions may be based on data rules, operating rules and/or rules of ordering specific to the file system. Based on the request, the driver 170 generates the appropriate instructions that can be used to effect the operation desired by the client 120. The instructions are then forwarded to the client 120 which, in turn, provides the instructions to the file system for execution. While the instructions may not be decipherable to the client 120, such instructions may be used by the file system to perform the desired operation. As can be seen from the foregoing example, the client 120 essentially reflects the request back to itself, albeit in a alternative form, using the server 110 as the means of translating the request into an appropriate format for execution by the file system. The server 110 and the client 120 may be viewed as a virtual collective unit capable of communicating with the device 130.

While the foregoing example illustrates the device 130 as a file system, it should be noted that the device 130 may include other types of devices and/or functions. It should be further noted that the server 110 may further include other types of drivers corresponding to other devices, thereby allowing the client 120 to interact with multiple devices. The command pipe 160 may be configured to identify different types of requests corresponding to different devices and forward such requests respectively to their associated drivers accordingly. Multiple logical connections may be established between the server 110 and the various devices via the client 120, allowing the client 120 to direct these various devices to effect the desired operations. Based on the disclosure and teachings provided herein, a person of ordinary skill in the art will appreciate how to deploy the system in various applications and/or configurations according to the present invention.

The methods or systems described in connection with the embodiments disclosed herein may be embodied directly in hardware, in a software module executable by a processor, or in a combination of both, in the form of control logic, programming instructions, or other directions, and may be contained in a single device or distributed across multiple devices. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor.

The above description is illustrative but not restrictive. Many variations of the present invention will become apparent to those skilled in the art upon review of the disclosure. The scope of the present invention should, therefore, be determined not with reference to the above description, but instead should be determined with reference to the pending claims along with their full scope or equivalents.

What is claimed is:

1. A system for communicating with a device, the system comprising:
   a client configured to issue a request, the request representing an operation to be performed by the device; and
   a server configured to:
      receive the request from the client and translate the request into a format that is decipherable by the device;
      establish a logical connection with the device via the client; and
      forward the translated request to the device via the logical connection;
   wherein the device is configured to act on the translated request to effect the operation, wherein the client is unable to effect the operation directly with the device, wherein the server includes a driver that is configured to translate the request, wherein the client is configured to communicate the request to the server using a designated protocol, and wherein the designated protocol is different from the format that is decipherable by the device.

2. The system of claim 1 wherein the client and the server are remotely connected to each other.

3. The system of claim 1 wherein the driver includes operating rules specific to the device.

4. The system of claim 1 wherein the device includes a file system.

5. The system of claim 1 wherein the translated request is not decipherable to the client.

6. A reflective driver system comprising:

a device;

a client having protocol logic, the protocol logic configured to issue a request, the request representing an operation to be performed by the device; and a server having:

a command pipe configured to receive the request from the client;

a driver having operating rules specific to the device, the driver configured to generate a translated request that is decipherable by the device; and associated connection logic configured to establish a logical connection with the device via the client, wherein the translated request is forwarded to the device via the logical connection, wherein the device is configured to act on the translated request to effect the operation, wherein the client is unable to effect the operation directly with the device, wherein the protocol logic is configured to communicate the request to the server using a designated protocol, and wherein the designated protocol is different from a format used by the translated request.

7. The reflective driver system of claim 6 wherein the client and the server are remotely connected to each other.

8. The reflective driver system of claim 6 wherein the device includes a file system.

9. The reflective driver system of claim 6 wherein the translated request is not decipherable to the client.

10. A method for facilitating communications between a client and a device, the method comprising:

directing the client to issue a request, the request representing an operation to be performed by the device;

forwarding the request to a server;

directing the server to translate the request into a format that is decipherable by the device;

establishing a logical connection between the server and the device via the client; and forwarding the translated request to the device via the logical connection, wherein the device acts on the translated request to effect the operation, wherein the client is unable to effect the operation directly with the device, wherein the server includes a driver that is configured to translate the request, wherein the request is forwarded to the server using a designated protocol, and wherein the designated protocol is different from the format that is decipherable by the device.

11. The method of claim 10 wherein the client and the server are remotely connected to each other.

12. The method of claim 10 wherein the driver includes operating rules specific to the device.

13. The method of claim 10 wherein the device includes a file system.

14. The method of claim 10 wherein the translated request is not decipherable to the client.

15. A system for communicating with a device, the system configured to:

issue a request, the request representing an operation to be performed by the device;

send the request to a second system to translate the request into a format that is decipherable by the device;

facilitate establishing a logical connection between the second system and the device;

receive the translated request via the logical connection; and send the translated request to the device, wherein the device is configured to act on the translated request to effect the operation, wherein the system is unable to effect the operation directly with the device, wherein the second system includes a driver that is configured to translate the request, wherein the system is configured to communicate the request to the second system using a designated protocol, and wherein the designated protocol is different from the format that is decipherable by the device.

16. A system, comprising:

protocol logic, the protocol logic configured to issue a request, the request representing an operation to be performed by a device; and connection logic configured to facilitate establishing a logical connection between a second system and the device, wherein the second system includes a driver having operating rules specific to the device, the driver configured to generate a translated request that is decipherable by the device, wherein the system is configured to send the translated request to the device, wherein the device is configured to act on the translated request to effect the operation, wherein the system is unable to effect the operation directly with the device, wherein the protocol logic is configured to communicate the request to the second system using a designated protocol, and wherein the designated protocol is different from a format used by the translated request.

17. A storage medium encoded with instructions for facilitating communications with a device, the instructions comprising code for:

issuing by a first system a request, the request representing an operation to be performed by the device;

sending the request using a designated protocol to a second system to translate the request into a format that is decipherable by the device;

facilitating an establishment of a logical connection between the second system and the device;

receiving the translated request by the first system; and sending the translated request by the first system to the device, wherein the device is configured to act on the translated request to effect the operation, wherein the first system is unable to effect the operation directly with the device, wherein the second system includes a driver that is configured to translate the request, and wherein the designated protocol is different from the format that is decipherable by the device.

18. A system for facilitating communications with a device, the system configured to:

receive a request from a second system, the request representing an operation to be performed by the device;

translate the request into a format that is decipherable by the device;

facilitate establishing a logical connection with the device via the second system; and send to the second system the translated request to be forwarded to the device, wherein the device is configured to act on the translated request to effect the operation, wherein the second system is unable to effect the operation directly with the device, wherein the system includes a driver that is configured to translate the request, wherein the system is configured to receive the request from the second system using a designated protocol, and wherein the designated protocol is different from the format that is decipherable by the device.

19. A system, comprising:

a command pipe configured to receive a request from a second system using a designated protocol, the request representing an operation to be performed by a device; and a driver having operating rules specific to the device, the driver configured to generate a translated request that is decipherable by the device, connection logic configured to facilitate establishing a logical connection between the system and the device via the second system, wherein the second system is configured to send the translated request to the device, wherein the device is configured to act on the translated request to effect the operation, wherein the second system is unable to effect the operation directly with the device, and wherein the designated protocol is different from a format used by the translated request.

20. A storage medium encoded with instructions for facilitating communications with a device, the instructions comprising code for:

receiving by a first system a request from a second system, the request representing an operation to be performed by the device;

translating the request into a format that is decipherable by the device;

facilitate establishing a logical connection with the device via the second system; and sending to the second system the translated request to be forwarded to the device, wherein the device is configured to act on the translated request to effect the operation, wherein the second system is unable to effect the operation directly with the device, wherein the first system includes a driver that is configured to translate the request, and wherein the designated protocol is different from the format that is decipherable by the device.

* * * * *